United States Patent

Baldassini

[11] Patent Number: 5,199,393
[45] Date of Patent: Apr. 6, 1993

[54] TIMING APPARATUS FOR A FOUR-STROKE ENGINE WITH CAMSHAFTS RUNNING AT DIFFERENTIATED ANGULAR ROTATION

[76] Inventor: Lando Baldassini, Via Della Fortezza 6, S. Piero A Sieve (Firenze), Italy

[21] Appl. No.: 897,321

[22] Filed: Jun. 11, 1992

[30] Foreign Application Priority Data

Jun. 11, 1991 [IT] Italy ............................. 137 A/91

[51] Int. Cl.$^5$ ............................................. F01L 1/34
[52] U.S. Cl. ................................ 123/90.17; 123/90.31
[58] Field of Search ............... 123/90.15, 90.17, 90.31

[56] References Cited

U.S. PATENT DOCUMENTS

| | | | |
|---|---|---|---|
| 3,633,555 | 1/1972 | Raggi | 123/90.17 |
| 4,505,235 | 3/1985 | Mitchell | 123/90.31 |
| 5,074,260 | 12/1991 | Yagi et al. | 123/90.31 |
| 5,080,053 | 1/1992 | Parsons | 123/90.31 |
| 5,107,802 | 4/1992 | Yagi et al. | 123/90.31 |

FOREIGN PATENT DOCUMENTS 3804333 8/1989 Fed. Rep. of Germany ... 123/90.31

Primary Examiner—E. Rollins Cross
Assistant Examiner—Weilun Lo
Attorney, Agent, or Firm—McGlew and Tuttle

[57] ABSTRACT

Timing apparatus for a four-stroke engine with at least a shaft (2) of cams (7) located over the head of the cylinders and with the cams (7) acting directly on the valves (4), wherein the rotary motion of each shaft (2) of cams (7) is derived from a transmission shaft (1) parallel to the camshaft and driven by the engine crankshaft through a pair of identical gears (3,30) which are eccentrically keyed, one (3) on the transmission shaft (1) and the other (30) on the shaft (2) of cams (7), and are also 180°-out-of-phase to one another, and with the cam (7) which is provided for the opening of the relevant valve (4) keyed on the shaft (2) of cams (7) having the maximum radius (r2) lift in phase with the minimum radius (R2) of rotation of the corresponding gear (30) eccentrically keyed on he same shaft (2) of cams (7).

5 Claims, 2 Drawing Sheets

TIMING APPARATUS FOR A FOUR-STROKE ENGINE WITH CAMSHAFTS RUNNING AT DIFFERENTIATED ANGULAR ROTATION

The present invention refers to a timing apparatus for a four-stroke engine with camshafts running at differentiated angular rotation.

It is known that the overhead-valve timing of very fast internal combustion engines such as of racing type, includes using at least one camshaft located over the head of the cylinders and with cams controlling the opening of the valves with or without the interposition of rocker levers, while the closing of the valves is provided by very strong return springs.

According to such known type of timing, the motion of the camshafts is obtained with toothed wheels (gears) by which the round angle of rotation is subdivided into two arches of 180° each, one of which for the opening and the other of the closing of every valve, each arch being run with equal speed and, therefore, in the same time.

The object of the present invention is to achieve a 180° rotation of the camshaft at minimum speed and 180° rotation at maximum speed, the maximum speed and the minimum speed being used, respectively, for the closing and opening of the corresponding valve.

This result has been achieved according to the invention by providing a timing apparatus for a four-stroke engine with at least a camshaft located over the head of the cylinders and with the cams acting directly on the valves, wherein the rotary motion of each camshaft is derived from a transmission shaft, parallel to the camshaft and driven by the engine crankshaft through a pair of identical gears which are eccentrically keyed, one on the transmission shaft and the other on the camshaft, 180°-out-of-phase to one another and with the cam provided for the opening of the relevant valve having the maximum radius lift in phase with the minimum radius of rotation of the corresponding gear eccentrically keyed on the same camshaft.

The advantages achieved by the present invention consist essentially in that it is possible to prolong the deceleration cycle during the valves opening, and this even by means of cams having little accentuated profiles; that it is possible to reduce the force to win the resistance of the return-valve springs, thanks to the gain due to the difference of the radii of rotation of the eccentric gears; that an apparatus according to the invention is easy to build and offers great reliability even at high speeds.

These and further advantages and characteristics of the invention will be better understood by any skilled in the art by a reading of the following description and with reference to the accompanying drawings given as a practical exemplification of the invention but not to be considered in a limited sense; in the drawings.

Figure 1:
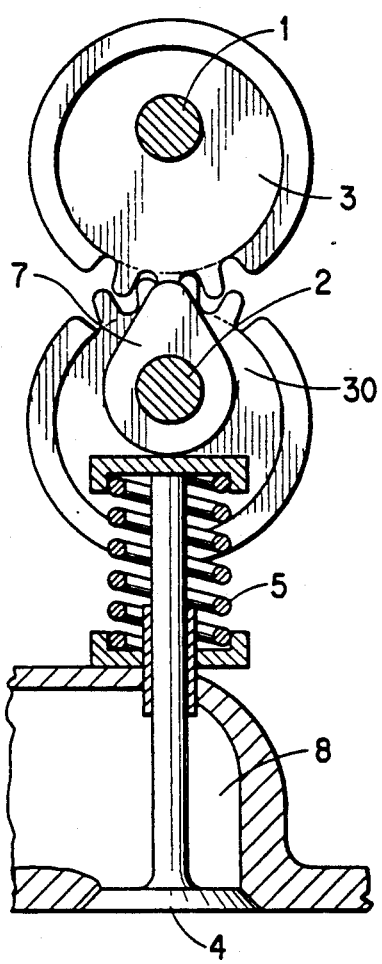
FIG. 1 shows a front view, partly in section, of an apparatus according to the invention for the control of a valve for a four-stroke engine, in the closed valve condition with the cam at the maximum acceleration.
Figure 2:
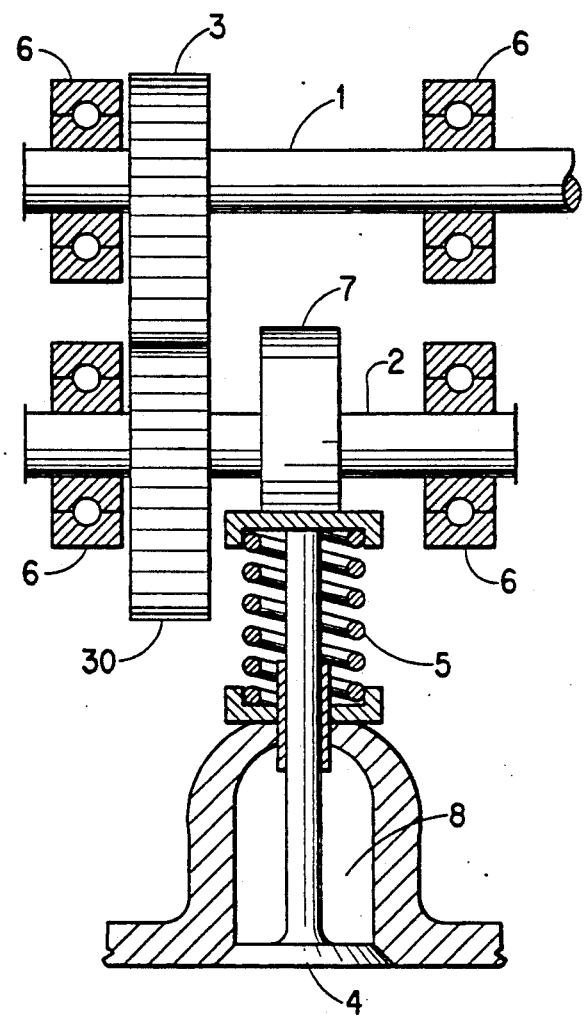
FIG. 2 is a side view of the apparatus of FIG. 1.
Figure 3:
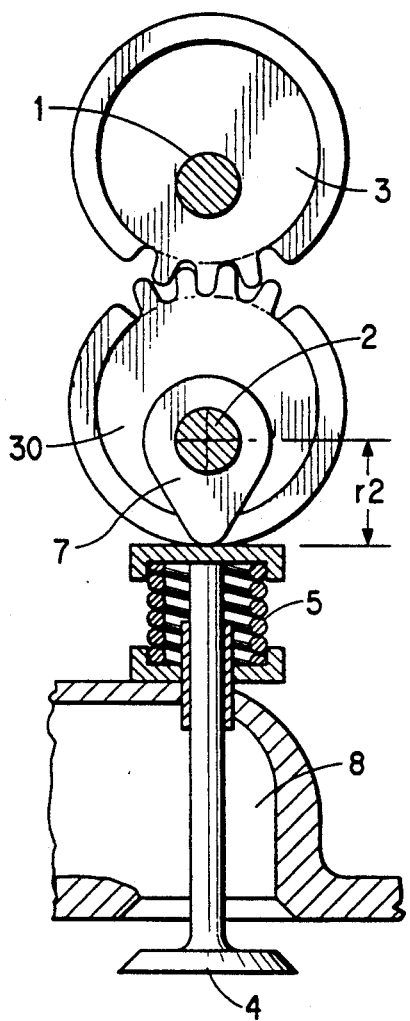
FIG. 3 shows the front view of the apparatus of FIG. 1 in the open valve condition with the cam at the maximum deceleration stage.
Figure 4:
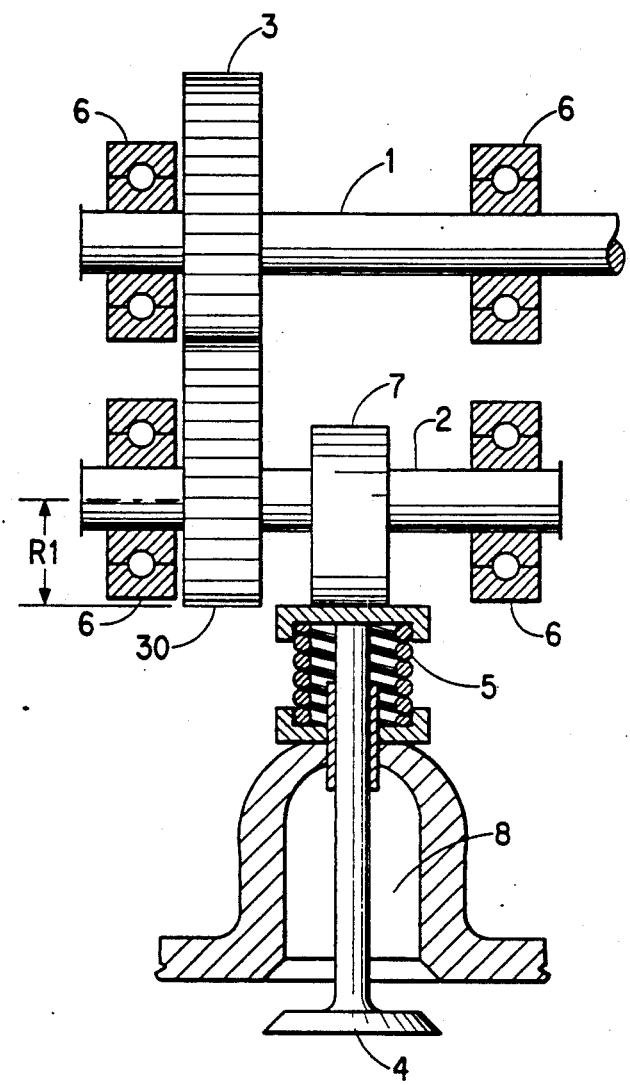
FIG. 4 shows the side view of the apparatus of FIG. 3.

Reduced to its essential structure and with reference to the figures of the attached drawings, a timing apparatus in a four-stroke engine with the camshaft running at differentiated speed according to the invention includes:

a transmission shaft (1) mounted on bearings (6) which is placed on the cylinder head and is driven by the crankshaft of the engine in a manner known per se and not shown for simplicity;

a shaft (2) parallel to the transmission shaft (1) with a cam (7) for the opening of the valve (4) of the induction or exhaust duct (8);

a pair of toothed wheels (3,30) which are eccentrically keyed, one (3) on the shaft (1) and the other (30) on the shaft (2) and 180° out of phase to each other to allow the shaft (2) to perform, upon each turn of the shaft (I) at constant speed, half a turn at minimum speed and half a turn at maximum speed: the cam (7) keyed on the shaft (2) having the radius (r2) of maximum lift in phase with the minimum radius (R2) of rotation of gear (30). In this way, the opening of the valve takes place during the half turn the shaft (2) runs at reduced speed and, thus, in a time longer than the one for the closing.

It will be appreciated that transmission shaft (1) is able to control the rotation of the two camshafts (2), one for activating the induction valve(s), and the other for activating the exhaust valve(s) in a single-cylinder engine, as well as to control more camshafts (2) disposed in line in a multicylinder engine.

According to the invention, there is advantageously provided that the degree of keying eccentricity of the gears (3,30) on the shafts (1,2) may vary at will, according to the desired duration of the opening/closing cycle of relevant valve (4), by using a cam (7) having a single profile.

Moreover, according to the invention, provision is made for using a same pair of gears (3,30), but with corrected toothing, for achieving the maximum allowable keying eccentricity.

I claim:

1. Timing apparatus in a four-stroke engine comprising a cam shaft located on a cylinder head and with a cam acting on a poppet valve, the apparatus further comprising a transmission shaft parallel to the camshaft driven by an engine crankshaft, which transmits the motion to the cam shaft through a pair of like toothed gears which are eccentrically keyed, one on the transmission shaft and the other on the cam shaft and substantially 180° out-of-phase to one another so that at every turn of the transmission shaft running at constant speed, the cam shaft performs half a turn at minimum speed and half a turn at maximum speed.

2. An apparatus according to claim 1, characterized in that the cam provided for the opening of the corresponding valve is keyed on the cam shaft with a maximum radius of lift being in phase with a minimum radius of rotation of the cam shaft gear.

3. An apparatus according to claim 1, further comprising two cam shafts for each engine cylinder, one for induction valves and the other for exhaust valves.

4. An apparatus according to claim 1, characterized in that said gears have corrected toothing to allow for a greater keying eccentricity.

5. An apparatus according to claim 1, characterized in that an amount of a keying eccentricity of the gears can be varied at will according to a duration of the opening and closing cycles of the relevant valve, said duration being achieved by the same cam profile.

* * * * *